US006101113A

United States Patent [19]
Paice

[11] Patent Number: 6,101,113

[45] Date of Patent: Aug. 8, 2000

[54] TRANSFORMERS FOR MULTIPULSE AC/DC CONVERTERS

[76] Inventor: Derek A Paice, 114 Rosewood Ct., Palm Harbor, Fla. 34685

[21] Appl. No.: 09/453,043

[22] Filed: Dec. 2, 1999

[51] Int. Cl.[7] .............................. H02M 7/06; H02M 7/00

[52] U.S. Cl. ................................ 363/126; 363/3; 363/70

[58] Field of Search ................................ 363/2, 3, 4, 39, 363/44, 67, 69, 70, 125, 126

[56] References Cited

U.S. PATENT DOCUMENTS

| | | |
|---|---|---|
| 3,628,123 | 12/1971 | Rosa . |
| 3,792,286 | 2/1974 | Meir . |
| 4,255,784 | 3/1981 | Rosa . |
| 5,446,642 | 8/1995 | McMurray . |
| 5,455,759 | 10/1995 | Paice . |
| 5,568,371 | 10/1996 | Pitel et al. . |
| 5,619,407 | 4/1997 | Hammond . |
| 5,781,428 | 7/1998 | Paice . |
| 6,028,405 | 2/2000 | Kume et al. . |

OTHER PUBLICATIONS

"Power Electronic Converter Harmonics" by Dereck A. Paice, May 1995, IEEE Press, ISBN 0–7803–1137–X.

*Primary Examiner*—Matthew Nguyen

[57] ABSTRACT

In a 12-pulse converter system a 3-phase auto transformer with 4 windings per phase is used to power two 6-pulse converter bridges connected in parallel with a large dc filter capacitor. The transformer rating is typically about 40% of the dc kW load. The voltage ratio is typically 1:1 so that the average dc output of a multi-pulse converter is generally the same as that of a conventional 3-phase bridge rectifier without transformer, however, ac input harmonic currents are greatly reduced. A small single-phase transformer is used to block unwanted circulating currents between the two 6-pulse converters. Where necessary to further reduce high frequency harmonic currents, a 3-phase ac line reactor may be connected in series with the source of ac power. Where a smaller degree of harmonic reduction is acceptable, only 3 windings per phase are required on the transformer and the small single-phase transformer is eliminated by raising the zero-sequence impedance of the auto transformer by means of an additional magnetic path. This method provides a higher zero-sequence impedance compared to a conventional 3-limb magnetic structure used in most 3-phase transformers. The 1:1 voltage ratio feasible in this invention facilitates retrofit applications, also the concept can be applied to a greater number of parallel converters such as those giving 18-pulse operation.

12 Claims, 10 Drawing Sheets

SINGLE-PHASE
SHELL TYPE CONSTRUCTION

THREE-PHASE
4-LIMB CONSTRUCTION

TRANSFORMERS FOR MULTIPULSE AC/DC CONVERTERS

FIELD OF THE INVENTION

The invention relates to static AC-to-DC power converters, such as can be used for AC or DC motor drive systems.

BACKGROUND OF THE INVENTION

To meet industry needs for electrical power converters which convert AC to DC without injecting large amounts of harmonic currents into the power system, several topologies are available. All require installation of extra equipment and add to the total cost. Preferred methods are those which perform well in practical power systems which incorporate voltage unbalance and preexisting harmonic voltages. The desirable harmonic performance of a 12-pulse method in which two rectifier converters are paralleled, is made more difficult to implement because of the widespread industry practice of using a large dc filter capacitor across the dc output. However, this capacitor is not chosen simply on the basis of economics. It also provides better damping of the transient performance than is obtained with the classical dc filter inductor. Where parallel rectifier converters feed a large dc filter capacitor it is necessary to carefully match the impedance levels in each rectifier path to ensure current sharing and achieve the results expected from a 12-pulse system. This has been achieved with the aid of symmetrically configured double-wound transformers, or double-wound transformers providing phase shift by means of a delta/wye connection as shown in the prior art given in FIG. 1A. Cost improvements are feasible with suitable auto-transformers and FIG. 1B. suggests one approach, however, the problems of retaining true 12-pulse operation with such methods has hindered their application. The method described here enables the full potential of a low cost, 12-pulse parallel connection be achieved.

BRIEF SUMMARY OF THE INVENTION

An auto-transformer with windings configured in a wye manner is arranged to provide output voltages which are of equal amplitude to the power source, and with a total phase displacement of generally 30° between the voltages for two converters in a 12 pulse connection. Due to the generally 1:1 correspondence between power input voltage and voltages available to be applied to the converter rectifiers, the resulting dc output voltage is substantially the same as if only a single rectifier converter is connected. Thus the benefits of 12-pulse operation can be obtained without changing the basic design requirements of the dc load. The proposed auto transformer is not limited to 12-pulse operation, and an example is also given for a possible 18-pulse connection. In its preferred form for 12-pulse operation a single transformer with 4 windings per phase provides phase shifts of ±15° in such a manner that the transformer impedance presented to the two converters is generally equal. An additional small, single-phase transformer is used to create a high zero-sequence impedance and block triplen currents (3rd harmonic and multiples thereof) in the 3 ac lines associated with one of the converters. By this means each converter operates independently without significant circulating current. If the third harmonic currents were not suppressed, proper 12-pulse operation with its attendant harmonic current reduction would not be obtained. In a variation of the preferred method only 3 windings per phase are required on the wye connected auto transformer and the small single-phase transformer is eliminated by the addition of an additional magnetic path such that the zero-sequence impedance of the phase-shifting auto transformer is significantly increased. The preferred embodiment for 12-pulse operation is shown in FIG. 3.

DETAILED DESCRIPTION OF THE INVENTION

The essence of this invention provides the topology and components to economically replace existing nominally 1:1 double-wound transformers used to feed 2 rectifier bridges for 12-pulse operation. The principle can be extended to higher pulse numbered systems, such as 18 pulse.

Figure 1A:
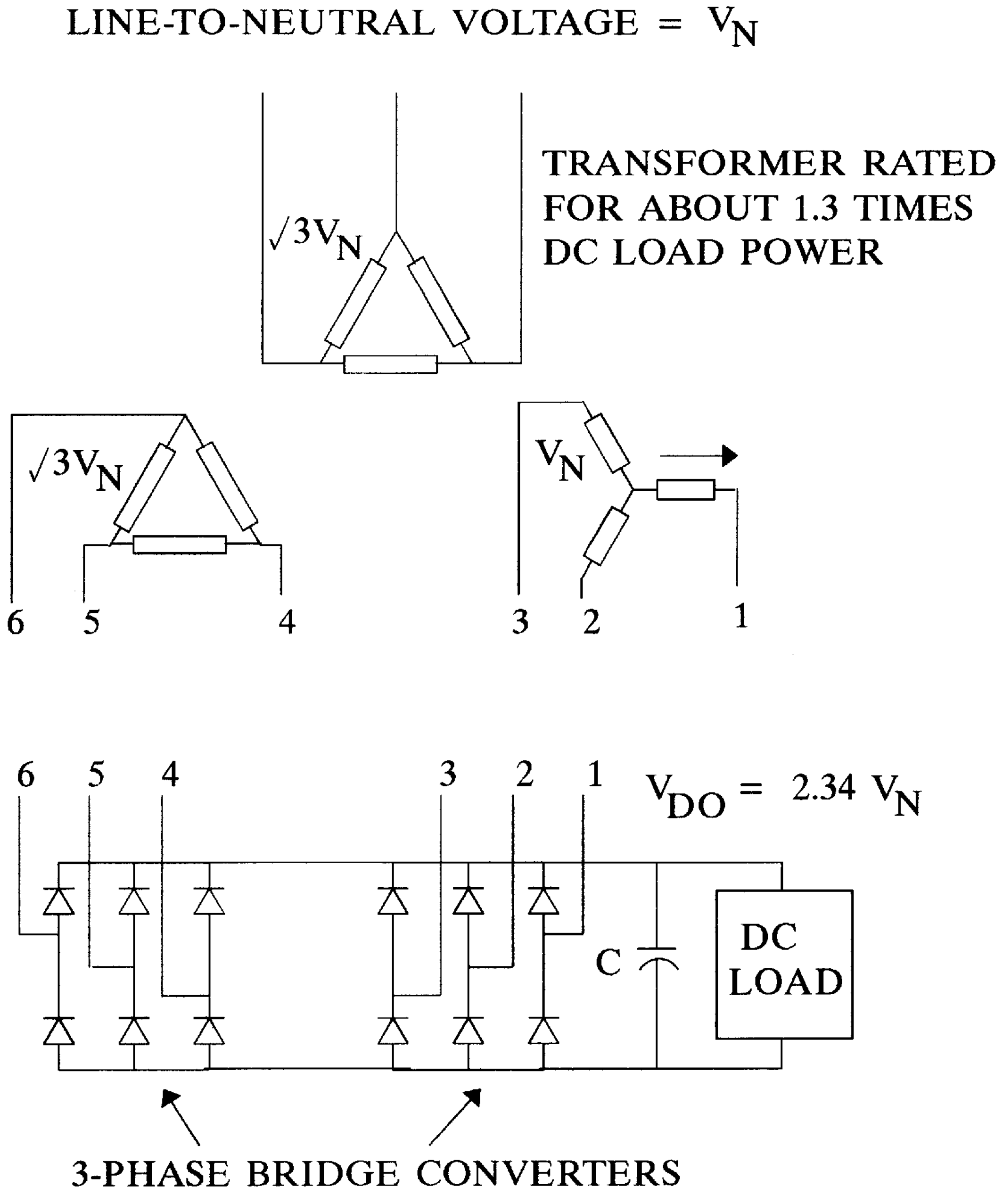
PRIOR ART FIG. 1A
FIG. 1A shows the prior art in which a double-wound transformer with delta-wye output windings produces fixed-amplitude, phase-shifted ac power sources for two 3-phase ac to dc converter bridges which are directly paralleled and share a large filter capacitor C, and dc load. In this design the transformer has a power rating which, depending upon leakage inductance, is typically about 1.3 times the kW of the dc load. The dc output voltage under load is about 2.34 times the line to neutral voltage ($V_N$) of the two secondary winding outputs.
Figure 1B:
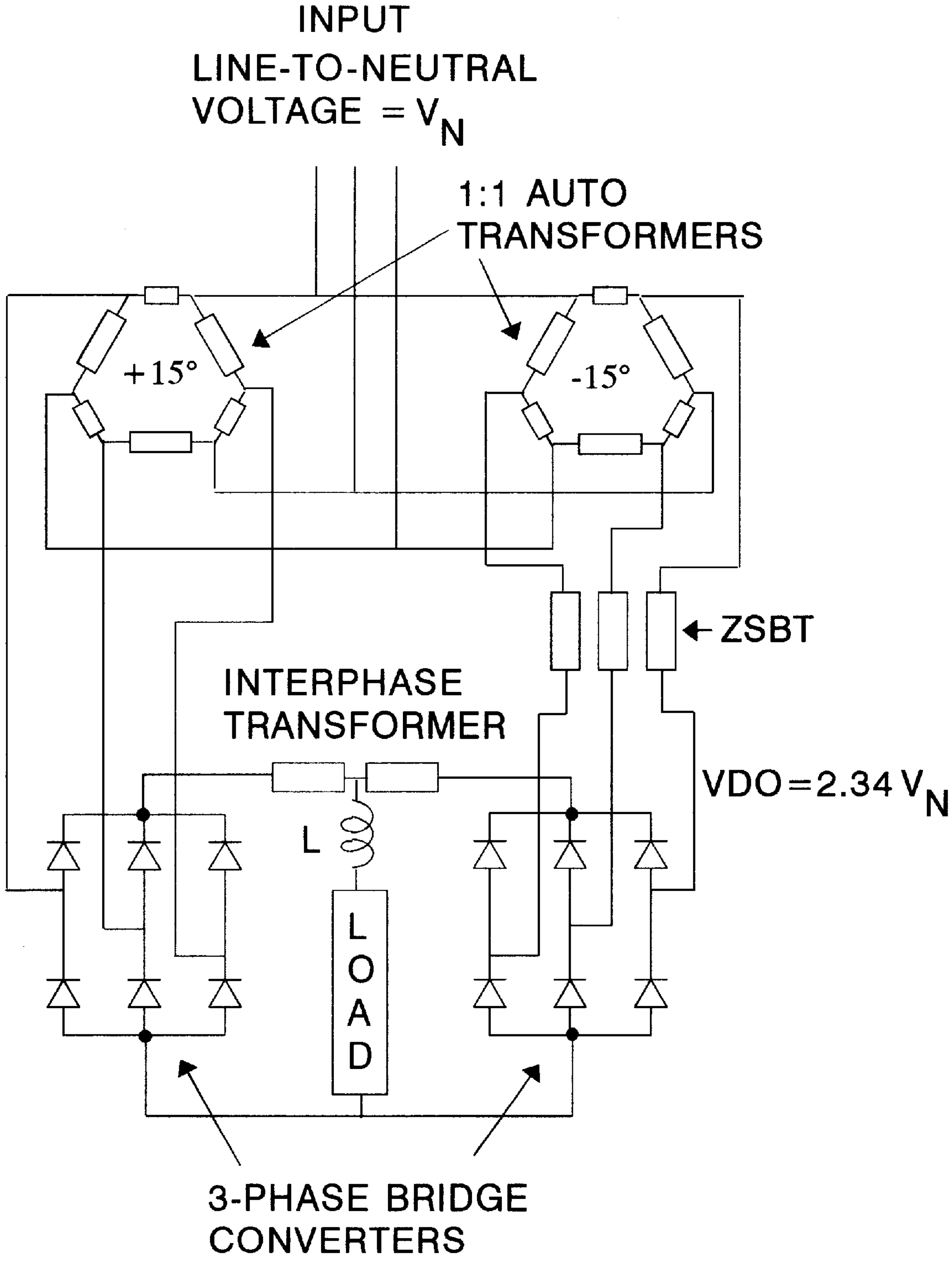
PRIOR ART FIG. 1B
FIG. 1B from page 157 of ISBN 0-7803-1137-X shows a possible method of using two auto transformers in conjunction with a special harmonic blocking transformer ZSBT (described later) and with a conventional interphase transformer and large dc filter inductor L, to give a smooth dc current.
Figure 2:
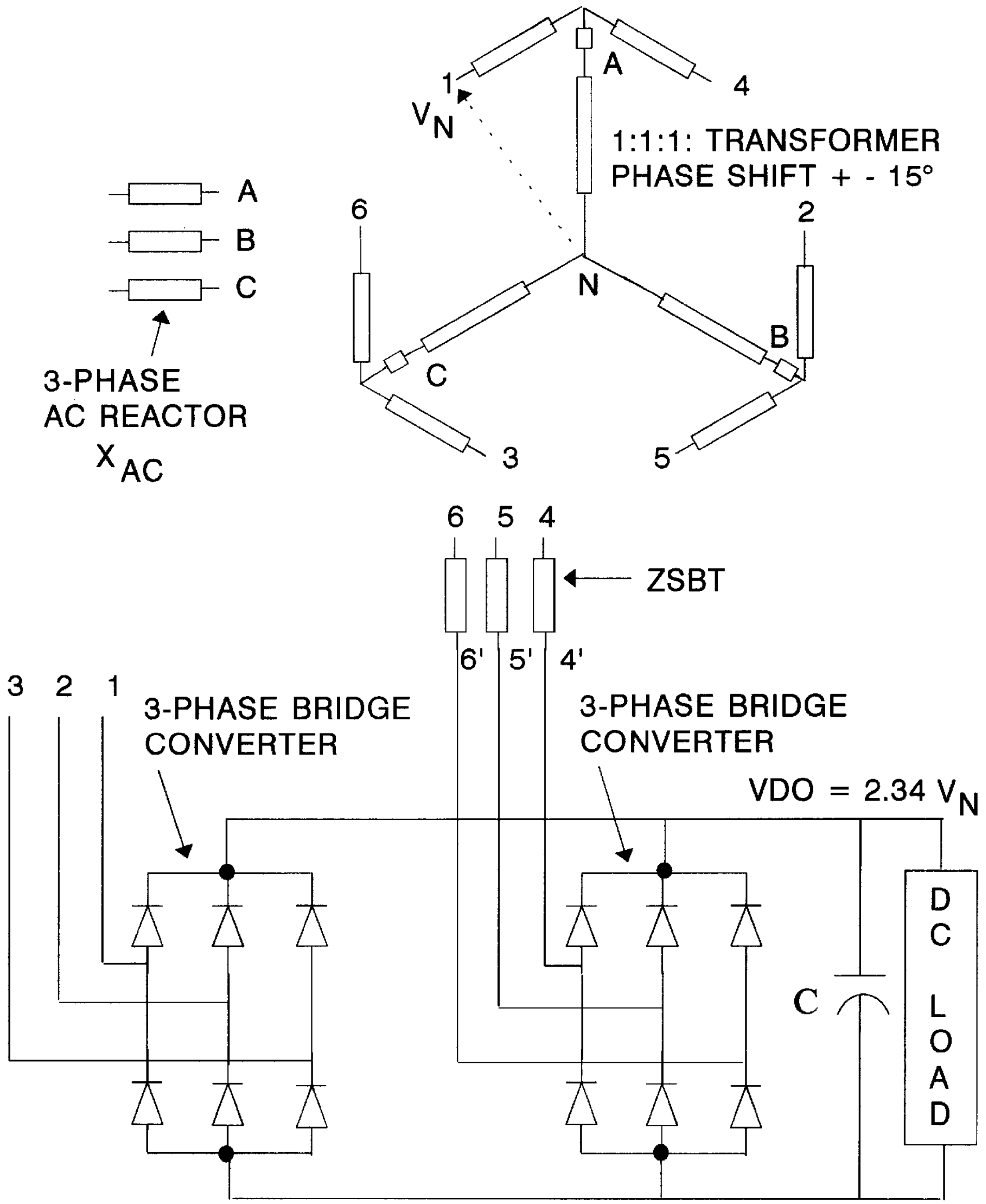
FIG. 2 shows the preferred embodiment of the invention in which two 3-phase converter bridges with common filter capacitor C, and dc load are fed from windings on an auto connected, wye configuration in which the phase displacements of the output voltages is generally ±15°. A 3-phase ac input is applied at terminals A, B, and C and two 3-phase sets of output voltages are obtained at points 1, 2, 3, and 4, 5, and 6. The ZSBT is a single-phase transformer with equal and isolated windings and suppresses the flow of triplen harmonics and allows the converters to operate substantially independently such that 12-pulse operation is obtained. The two sets of ac output voltage are of the same amplitude and by virtue of design symmetry have equal series impedance; thus balanced performance is assured. The dc output voltage is typically 2.34 times the amplitude VN of the ac line-to-neutral voltage applied to each 3-phase rectifier.

FIG. 2 shows the preferred embodiment of the invention in which two 3-phase converter bridges with common filter capacitor C, and dc load are fed from windings on an auto connected, wye configuration transformer in which the phase displacements of the output voltages is generally ±15°. A 3-phase ac input is applied at terminals A, B, and C and two 3-phase sets of output voltages are obtained at points 1, 2, 3, and 4, 5, and 6. A neutral point of the transformer windings occurs at point N.

One of the sets of 3-phase voltage (1,2,3) is applied directly to a first 3-phase bridge converter and the other voltage set (4,5,6) is applied to a second 3-phase bridge converter after passing through a single-phase transformer described as a ZSBT (zero-sequence blocking transformer) in ISBN 0-7803-1137-X. The ZSBT is a single-phase transformer with equal, but isolated windings and suppresses the flow of triplen harmonics. It allows the converters to operate substantially independently such that 12-pulse operation is obtained. Where necessary to further suppress high frequency harmonic currents an additional reactance $X^{AC}$ may be connected between the available power source and terminals A, B, and C.

The two sets of ac output voltage are of the same amplitude and by virtue of design symmetry have equal output impedance; thus balanced performance is assured. In many practical applications the transformer will provide a generally 1:1:1 ratio such that input and output voltages are the same amplitude. By this means the circuit is capable of being easily retrofitted into existing installations. The dc output voltage is typically 2.34 times the amplitude of the ac line-to-neutral voltage applied to each 3-phase rectifier.

Figure 3:
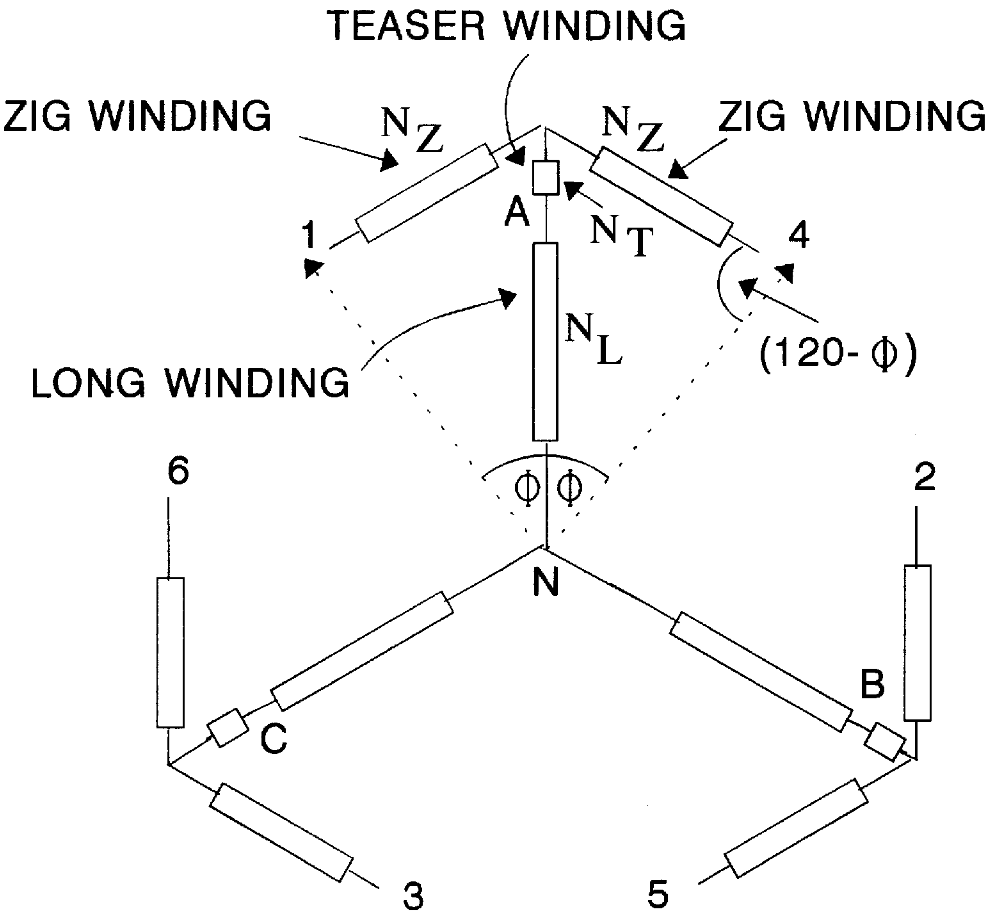
FIG. 3 shows the transformer used in the preferred embodiment and defines LONG, TEASER, and ZIG windings such that the phase shift angle±Φ° can be calculated with regard to the proportionality of these windings.

Referring to FIG. 3 the transformer is shown separately. Windings labeled as LONG, TEASER, and ZIG windings are assumed to have turns of $N_L$, $N_T$, and $N_Z$ respectively. Applying the vector algebra we find that the output voltage $V_{1-N}$ is given in relation to the input line-to neutral voltage $V_{AN}$ by:

$$V_{1-N} = V_{AN}\angle 0^\circ\left(1+\frac{N_T}{N_L}\right)+V_{AN}\angle 120^\circ\,\frac{N_Z}{N_L}$$

-continued $$\text{Solving for the real part, } R=\left(1+\frac{N_T}{N_L}-\frac{N_Z}{2N_L}\right)$$

$$\text{Solving for the imaginary part, } Q=\frac{\sqrt{3}}{2}\,\frac{N_Z}{N_L}$$

$$\text{From which } \Phi=\arctan\frac{\sqrt{3}\,N_Z}{(2N_L+2N_T-N_Z)} \quad (1)$$

$$\text{and the amplitude ratio of } \frac{V_{1-N}}{V_{AN}} \text{ is } \sqrt{R^2+Q^2} \quad (2)$$

Other output voltages such as $V_{2-N}$ etc. will have similar phase shift, either leading or lagging with respect to the input vectors and the amplitudes will be the same. The number of turns must be an integer and some useful results obtained from solving equations 1 and 2 are given in table 1. The transformer uses a 3-limb iron core and for best results the two ZIG windings on each phase are wound bifilar. The neutral point N is at the common junction of the LONG turns associated with each phase.

TABLE 1

Some typical turns for nominal 1:1 ratio and 15° phase shift

| $N_L$ | $N_T$ | $N_Z$ | Φ° | Ratio |
|---|---|---|---|---|
| 50 | 6 | 15 | 14.99 | 1.0042 |
| 73 | 9 | 22 | 15.02 | 1.0076 |
| 110 | 13 | 33 | 15.02 | 1.0024 |

Figure 4:
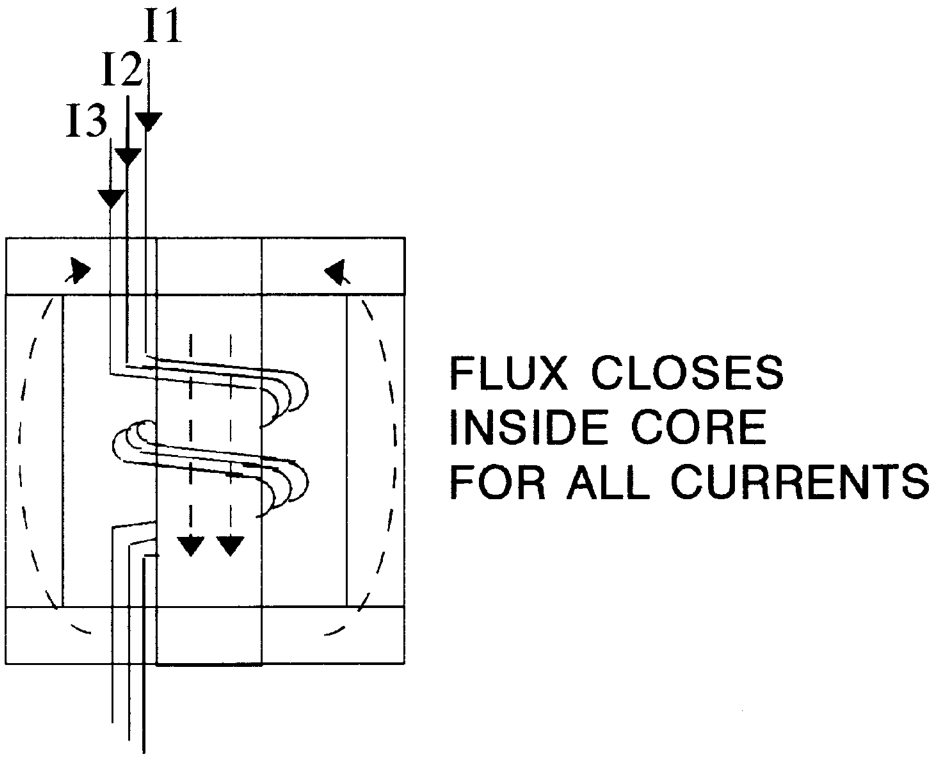
FIG. 4 shows the manner of construction of a typical ZSBT using a single-phase iron core and three isolated, but substantially identical, windings.

The ZSBT can be any single-phase structure and includes 3, ideally identical, windings. FIG. 4 shows the preferred form of construction for the ZSBT using a single-phase shell type core construction. The converter currents represented by I1, I2, and I3 represent a 3-phase set with fundamental currents displaced by 120°. These sum to zero. When the third harmonics are balanced they are all in the same phase relationship and can only sum to zero if each is zero, thus the ZSBT acts like a current transformer with three isolated coils and acts to block the 3rd harmonic and other zero-sequence currents. The ZSBT readily passes the desired positive and negative sequence currents.

The harmonic voltage developed across each of the ZSBT windings is primarily that of the third harmonic and is about 15% of the power system line-to-line voltage. The kVA rating of this transformer is typically 4% of the dc load kW. Excellent coupling and performance is obtained by winding the coils together, i.e. in a trifilar manner.

Figure 5:
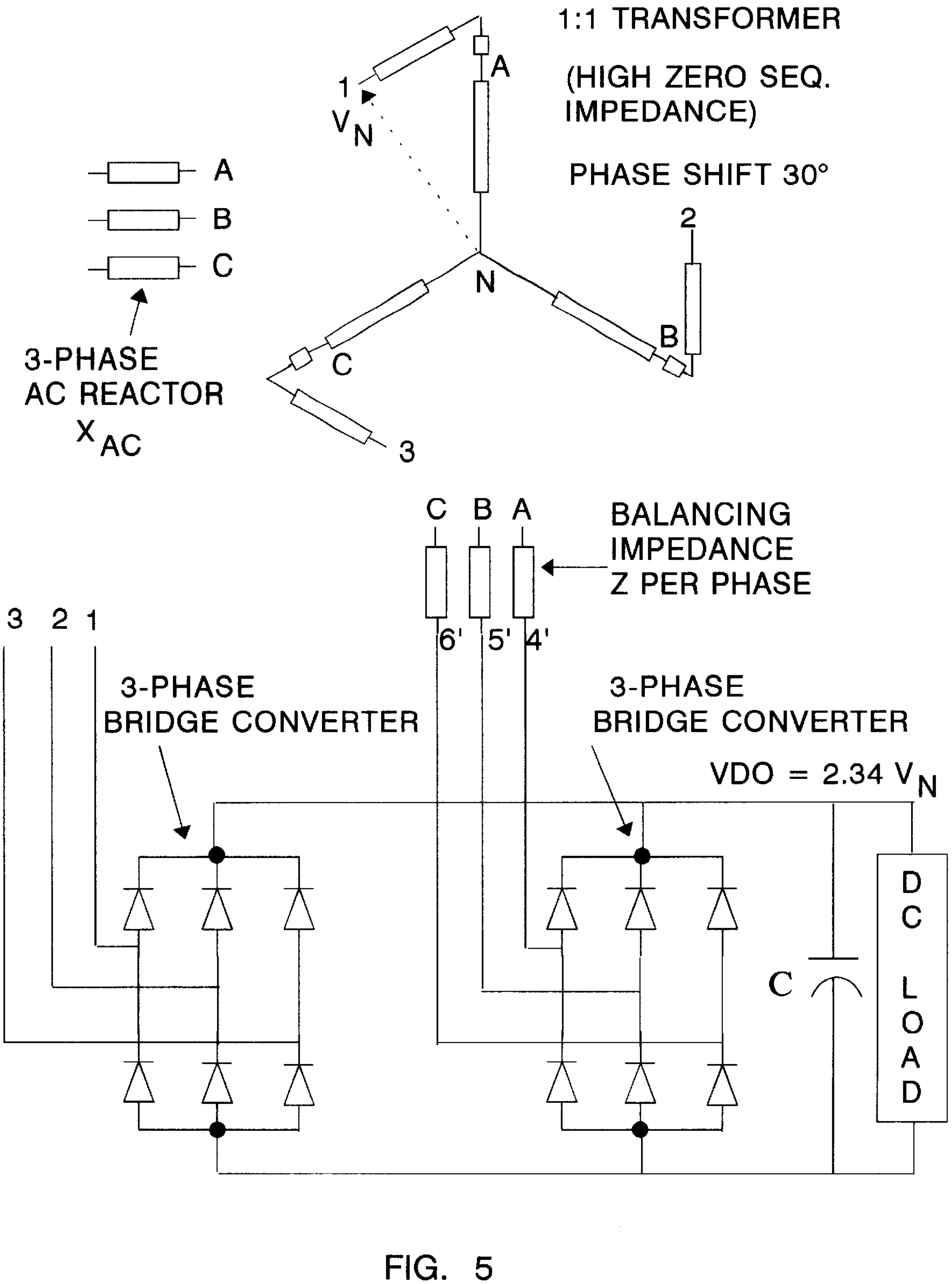
FIG. 5 shows an alternative arrangement in which the auto transformer has only 3 windings per phase. In this connection one rectifier bridge is fed directly from the 3 phase power source (A,B,C) with, where necessary, additional series impedance Z in each phase to balance the effects of any leakage inductance and winding resistance associated with the transformer windings. In this configuration the output voltage associated with terminals 1, 2, and 3 must be generally the same amplitude as the power source (A,B,C) and the phase shift Φ is ideally 30°. The transformer has an additional magnetic circuit to ensure high zero-sequence impedance. The dc output voltage is typically 2.34 times the amplitude of the line to neutral voltage applied to each 3-phase rectifier.

FIG. 5 shows an alternative embodiment of the invention in which the auto transformer voltage ratio is still 1:1, but there are only 3 windings per phase, and the phase shift Φ is nominally 30°. In this topology the transformer is fed at terminals A, B, and C and one 3-phase bridge converter is fed from the transformer output terminals 1, 2, and 3. A second 3-phase bridge converter is fed from the A, B, C, supply terminals via an impedance Z which is inserted in series with each phase. Impedance Z is selected as required to balance the impedance affects of the transformer and is chosen such that currents are properly balanced between the 2 converters. By reason of the transformer construction, no ZSBT is required in this circuit topology. Where necessary to further suppress high frequency harmonic currents an additional reactance $X_{AC}$ may be connected between the available power source and terminals A, B, and C.

Figure 6:
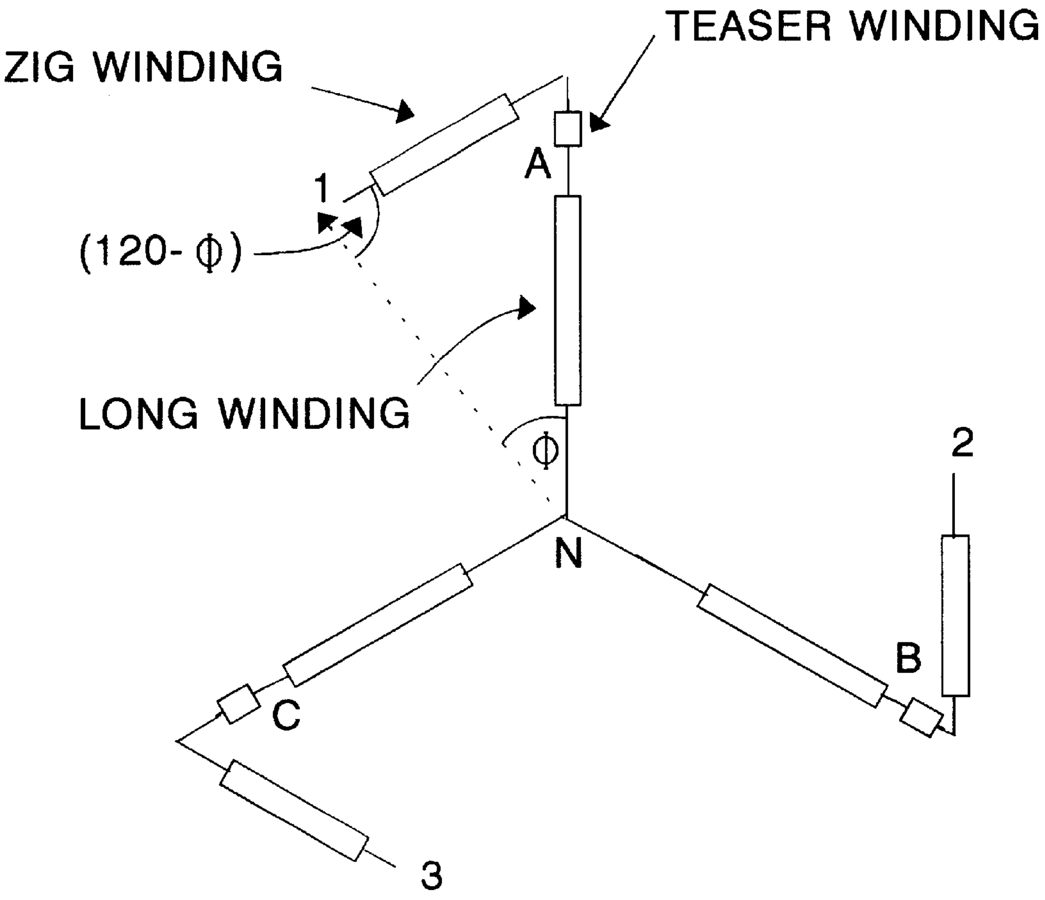
FIG. 6 shows the transformer used in the alternative embodiment and defines LONG, TEASER, and ZIG windings such that the phase shift angle Φ° can be calculated with regard to the proportionality of these windings.

FIG. 6 shows the transformer used in the alternative embodiment and defines LONG, TEASER, and ZIG windings such that the phase shift angle Φ° can be calculated with regard to the proportionality of these windings. The junction of the transformer long windings is at the neutral point N. Because of its manner of construction, shown in FIG. 7, this alternative implementation of the invention does not require the use of a zero-sequence blocking transformer. This function is supplied by the phase-shifting, auto transformer itself.

Using the same analysis as previously, some possible turn combinations for the transformer are given in table 2.

TABLE 2

Some typical turns for nominal 1:1 ratio and 30° phase shift

| $N_L$ | $N_T$ | $N_Z$ | Φ° | Ratio |
|---|---|---|---|---|
| 50 | 8 | 29 | 30.00 | 1.0046 |
| 72 | 11 | 42 | 30.39 | 0.9984 |
| 110 | 17 | 63 | 29.74 | 0.99988 |

Figure 7:
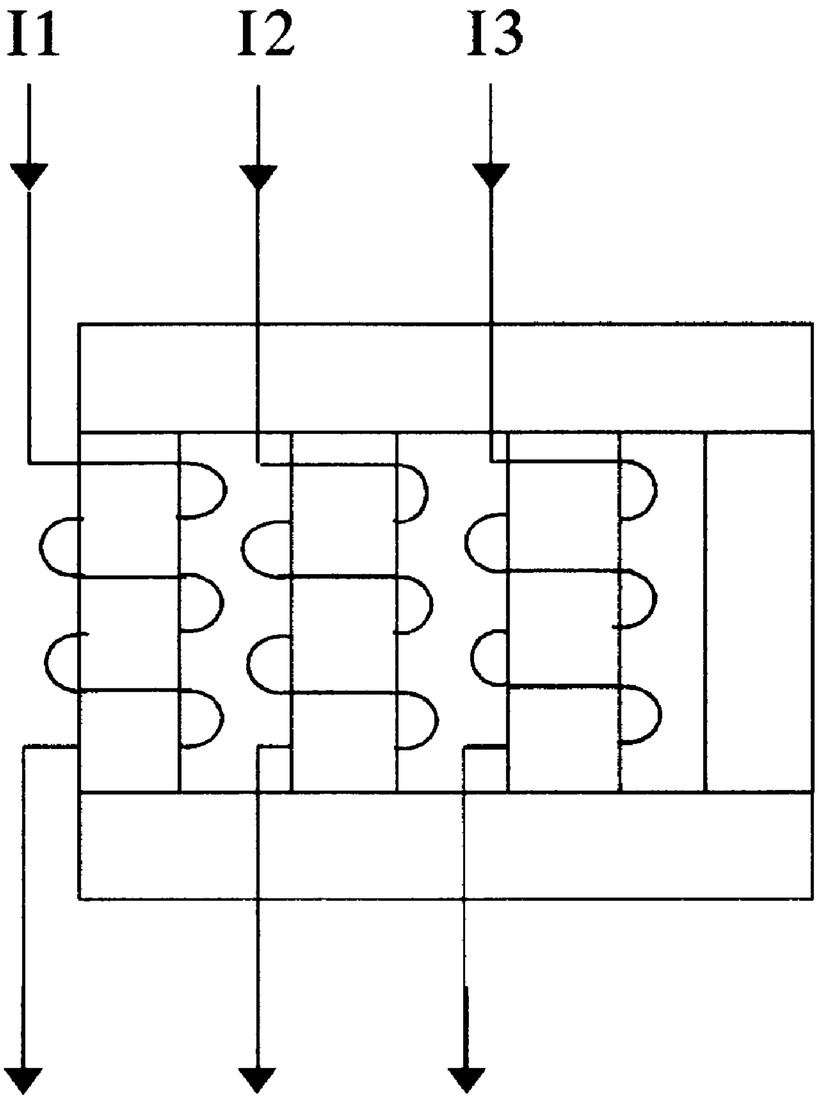
FIG. 7 shows the manner of construction for the transformer in the alternative embodiment, including the addition of a fourth iron path such that flux required by zero-sequence currents can that close through a low reluctance magnetic circuit. By this means a high zero-sequence impedance is obtained compared to most conventional 3-phase transformers which employ only a 3-core magnetic structure. Alternative placement of the additional magnetic path(s) is feasible so long as it provides a path through which zero-sequence fluxes, such as produced by third harmonics of current, can flow.

FIG. 7 shows the preferred form of transformer construction to achieve a high zero-sequence impedance and eliminate the ZSBT. Most conventional transformers use only 3 limbs on the iron core, but to ensure the required zero-sequence impedance a fourth limb of generally the same physical dimensions has been added. It is not necessary to limit the additional magnetic structure to a single magnetic path. For example, two magnetic paths, one at each side of the transformer, would function in the same manner. Final choice depends upon practical design issues. The additional magnetic path assures high zero-sequence impedance and ensures that the transformer currents I1, I2, and I13 contain primarily positive and negative sequence currents. The undesired 3rd harmonics of current, and multiples thereof, are suppressed. The transformer absorbs a 3rd harmonic of voltage, but in both the preferred and alternative forms of the embodiment, the transformer rating is only about 40% of the dc load.

Figure 8:
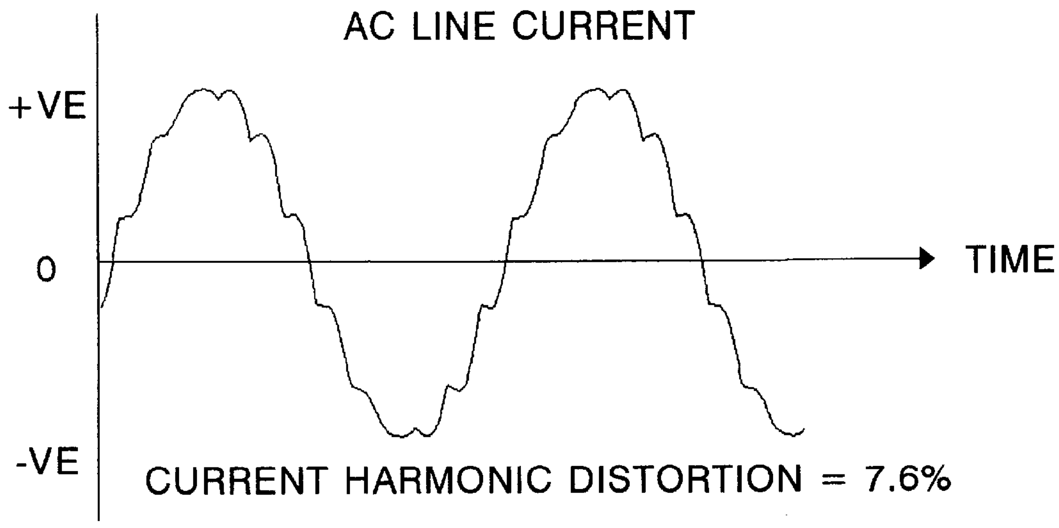
FIG. 8 shows typical ac line current waveforms typical of the preferred embodiment.
Figure 9:
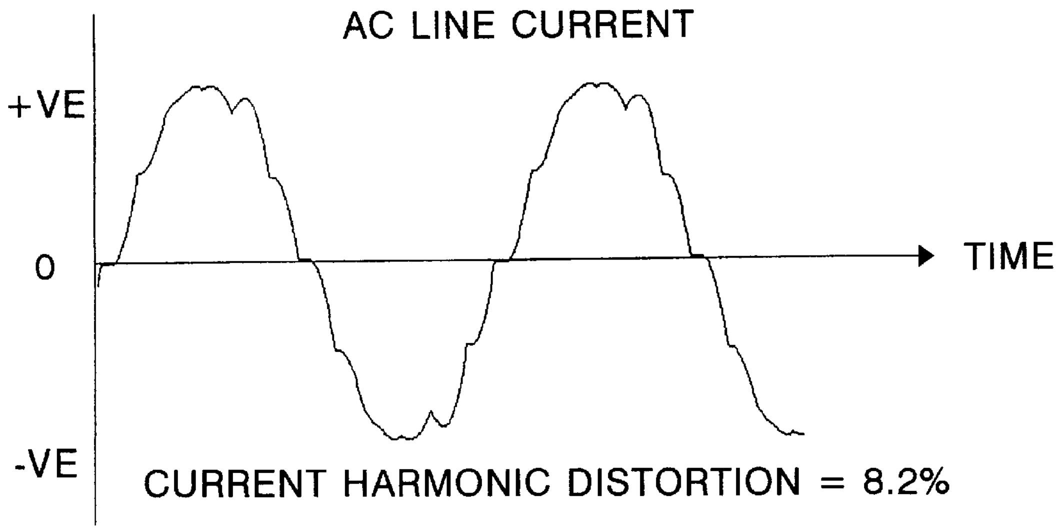
FIG. 9 shows typical ac line current waveforms of the alternative embodiment.

FIG. 8 shows some typical waveshapes of ac line input current using the preferred topology given in FIG. 2. FIG. 9 shows some typical waveshapes of ac line input current using the alternative, but effective topology given in FIG. 5.

Figure 10:
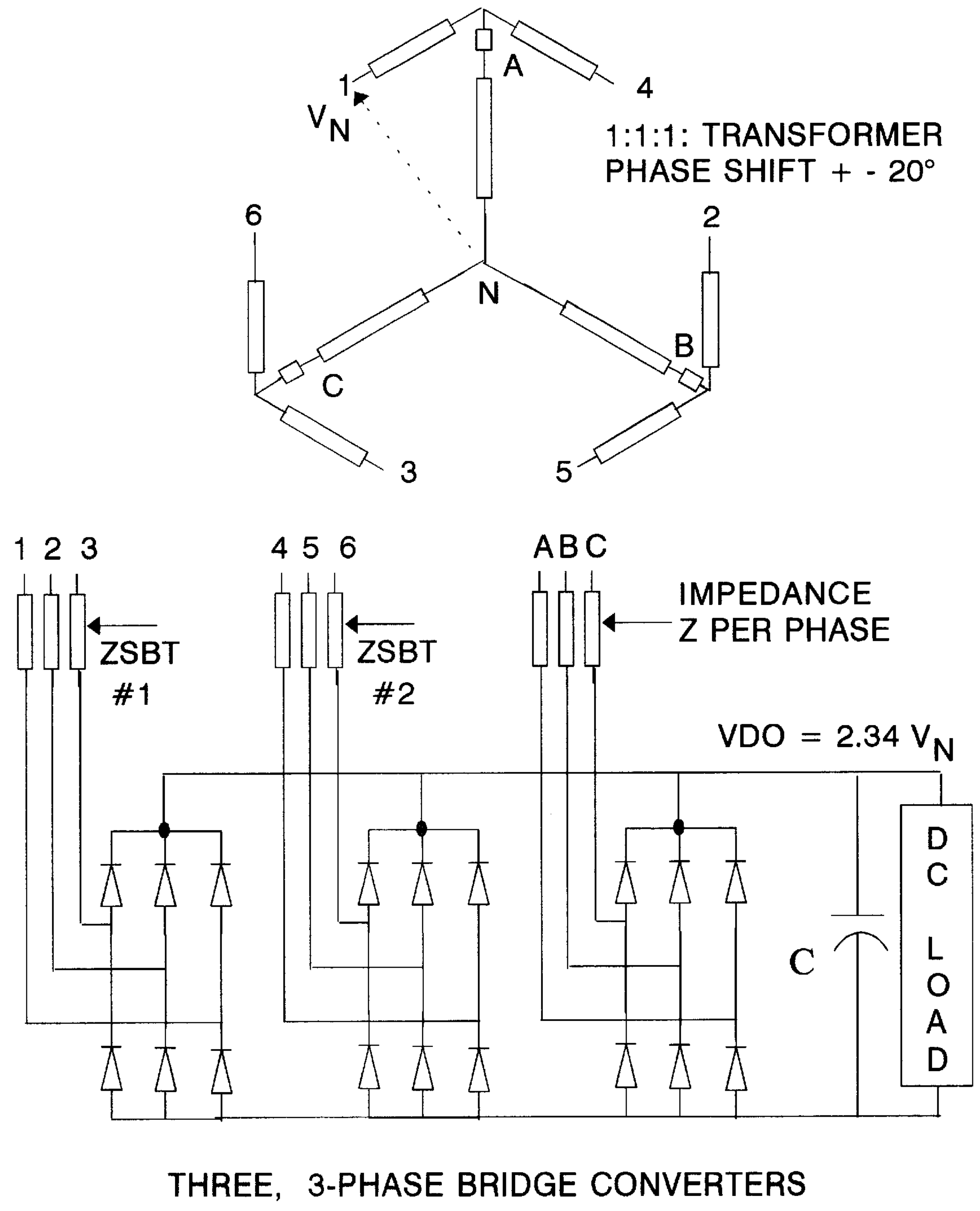
FIG. 10 shows extension of the invention to an 18 pulse converter connection.

The ability of the invention to economically produce a 1:1 voltage ratio with any phase shift, enables it to be used for other pulse numbers such as, for example, 18-pulse converter configurations. FIG. 10 shows the auto transformer applied in an 18 pulse connection in which the desired voltage ratio is 1:1 and the phase shift is ±20°. In this example the transformer has a phase shift of ±20° and 2 ZSBTs are required. Additional impedance in one line can be applied as needed to ensure balance of the three, 3-phase bridge converter currents.

What I claim as my invention is:

1. A multiple AC/DC converter system comprising a 3-phase wye connected auto transformer having four windings on each of 3 phases with two windings being connected in series to provide a tapped coil with one section of the coil being connected to form a neutral with the same coils from the other phases; with the tapping point being connected to one of the three power source lines; with the same connections on the other phases such that each of the lines of the three-phase source are connected to the tapping point on each transformer phase; with one winding from another phase being connected to the end of the tapping furthermost from the neutral point; with the remaining winding on the remaining phase also being connected to the end of the tapping furthermost from the neutral point; with the longer part of the tapped coil being called a LONG winding; with the shorter part of the tapped coil being called a TEASER winding; with the 2 remaining coils connected to the end of the TEASER winding remote from the tapping being called ZIG windings; with the proportionality of the turns comprising the LONG, TEASER, and ZIG windings being selected so as to achieve output voltages remote from the junction of the 2 ZIG coils which meet design requirements concerning amplitude and phase angle relative to the supply voltage; with such design requirements including amplitudes generally equal to that of the three-phase supply voltage and with phase angles of generally ±15° with respect to the supply voltage; wherein 6 output voltages of predetermined amplitude and phase are available.

2. The system of claim 1 wherein each current of either the 3 output voltages generally advanced, or the 3 output voltages generally retarded, flows through one of 3 electrically isolated windings on a separate single-phase transformer; where such isolated windings are generally equal in turns; whereby 6 output voltages of predetermined amplitude and phase are available with three such voltages acting through a series connected single-phase transformer.

3. The system of claim 2 whereby the six voltages are each connected to the center point of a separate pair of series connected semiconductor rectifying elements in which the anode of one element is connected to the cathode of another element, wherein the six cathode terminals of each pair of rectifying elements are connected together to form a positive terminal and the six anode terminals of each pair of rectifying elements are connected together to form a negative terminal.

4. The system of claim 2 wherein a 3-phase reactor is connected in series with the three-phase source connected to the tapping point on each transformer phase.

5. A multiple AC/DC converter system comprising a 3-phase wye connected auto transformer having three windings on each of 3 phases with two windings being connected in series to provide a tapped coil with one section of the coil being connected to form a neutral with the same coils from the other phases; with the tapping point being connected to one of the three power source lines; with the same connections on the other phases such that each of the lines of the three-phase source are connected to the tapping point on each transformer phase; with the remaining winding from another phase being connected to the end of the tapping furthermost from the neutral point; with the longer part of the tapped coil being called a LONG winding; with the shorter part of the tapped coil being called a TEASER winding; with the coil connected to the end of the TEASER winding remote from the tapping being called a ZIG winding; with the proportionality of the turns comprising the LONG, TEASER, and ZIG windings being selected so as to achieve output voltages remote from the junction of the ZIG winding and TEASER winding which meets requirements concerning amplitude and phase angle relative to the supply voltage; with such requirements including amplitudes of 1:1 and phase angle of generally 30°; wherein 3 voltages of predetermined amplitude and phase are available which in conjunction with the three-phase power source provides a source of six voltages; wherein the construction of the 3-phase transformer includes means such as an additional magnetic path to ensure high impedance to third harmonics of current and multiples thereof.

6. The system of claim 5 wherein each voltage obtained directly from the three-phase power source is caused to pass current through an appropriate impedance to compensate for the impedance of the phase shifting transformer; whereby 6 voltages of predetermined amplitude and phase are available with three such voltages acting through a series connected impedance.

7. The system of claim 6 whereby the six voltages are each connected to the center point of a separate pair of series connected semiconductor rectifying elements in which the anode of one element is connected to the cathode of another element, wherein the six cathode terminals of each pair of rectifying elements are connected together to form a positive terminal and the three anode terminals of each pair of rectifying elements are connected together to form a negative terminal.

8. The system of claim 5 wherein a 3-phase reactor is connected in series with the three-phase source connected to the tapping point on each transformer phase.

9. The system of claim I wherein each current of the 3 output voltages generally advanced in phase flows through one of 3 electrically isolated windings on a separate single-phase transformer; where such isolated windings are generally equal in turns; wherein each current of the 3 output voltages generally retarded in phase flows through one of 3 electrically isolated windings on another separate single-phase transformer; where such isolated windings are generally equal in turns; whereby in conjunction with the three-phase power source 9 voltages of predetermined amplitude and phase are available including phase relationships of generally +20°, 0°, and −20.

10. The system of claim 9 whereby the nine voltages are each connected to the center point of a separate pair of series connected semiconductor rectifying elements in which the anode of one element is connected to the cathode of another element, wherein the nine cathode terminals of each pair of rectifying elements are connected together to form a positive terminal and the nine anode terminals of each pair of rectifying elements are connected together to form a negative terminal.

11. The system of claim 10 wherein a 3-phase reactor is connected in series with the three-phase power source.

12. The system of claim 10 wherein each voltage obtained directly from the three-phase power source is caused to pass current through an appropriate impedance to compensate for the impedance of the phase shifting transformer.

* * * * *